United States Patent Office 2,916,379
Patented Dec. 8, 1959

2,916,379

METHOD OF PREPARING CAKES OF THE FOAM-BATTER TYPE

Thomas P. Finucane, Hartsdale, N.Y., assignor to General Foods Corporation, White Plains, N.Y., a corporation of Delaware No Drawing. Application December 30, 1957
Serial No. 705,830

8 Claims. (Cl. 99—92)

This invention relates to improved mixes of the foam-batter or non-shortening type for use in preparing angel food cakes and the like, wherein egg white is employed as a whipping agent to develop a foamy batter. More particularly, the invention is concerned with dry mixes for use in quickly and easily preparing foam-batter type cakes of increased height and good quality. This application is filed as continuation in part of U.S. Ser. No. 450,805, filed August 18, 1954.

Cake mixes of the foam-batter type presently on the market usually comprise two packages, one of which contains dried egg white, sugar and, if desired, additives such as cream of tartar. The second package contains flour, additional sugar and, if desired, either additives such as cream of tartar, starch and flavor. To prepare a cake from such a mix, water is added to the ingredients of the first package to reconstitute the egg white which is then whipped into a foam into which the ingredients of the second package are folded. The resulting batter is then baked to provide the finished cake.

Such foam-batter cakes whether they be of the angel food, sponge or chiffon variety are generally considered difficult to prepare by reason of the care which must be exercised in developing the foam and maintaining the same while incorporating the other cake ingredients. Numerous cake improvers have been employed in the past with a view to increasing the ability of egg white to develop good foam volume and stability when folding farinaceous ingredients into the foam.

However, despite the advances made in cake making techniques and the considerable commercial success experienced by using such cake improvers, there are a number of disadvantages which still characterize foam-batter cake preparation. The cake mix recipe must be followed precisely. The period of time during which the egg white is whipped is critical as is the manner in which whipping is performed, viz., so-called hand and mechanical whips still produce different degrees of foam development. Then, too, insufficient whipping by hand or mechanical means may not result in a sufficiently aerated foam, while excess whipping can result in a certain degree of foam destruction. Also, the average time required to develop the foam batter could be substantially reduced.

Difficulties stemming from non-uniformity of raw materials from which the mixes are manufactured, and cleanliness of mixing utensil continue, viz., it has been found that the whipping characteristics of dried egg white vary. Trace quantities of fat either in the mixing bowl or in the whipping apparatus can substantially impair foam development. Accompanying such impediments to batter preparation is a consequent reduction in foam height or volume. Also, when egg white (egg albumin) is used as the sole whipping agent, particularly when used at low levels in the interest of increased economy, its film forming property is such that an overexpansion of the air cells occurs upon baking with a resulting collapse of the cake upon cooling.

Even after development of the desired foam volume the foam developed may not have the desired stability with the result that there may be a reduction in foam height in the period preceding folding in of the ingredients of the second package. In many instances, although the desired foam height may be accomplished, final cake volume or height after baking as well as the degree of quality for the cake may be inadequate.

Another desirable feature for foam-batter type cake preparations is the provision of a single package dry mix which could be used to prepare a batter simply by adding water and mixing. The achievement of such a single package cake mix has long been a desired goal of those skilled in the art and will essentially include the egg white as a whipping agent and sugar and farinaceous ingredients as the principal constituents. As set forth in the copending U.S. patent application of Finucane et al., Serial No. 430,980, filed May 19, 1954, it has been discovered that such a foam-batter type cake mix can be provided from a single package by controlling the anti-foaming agent present in the mix, particularly the fat introduced by the farinaceous ingredient, to wit, flour. By reducing the amount of flour fat or other anti-foaming agent below a level at which it would prevent whipping of the egg white, it is now possible to whip a foam batter simultaneously with the farinaceous ingredients, provided the flour fat or other anti-foaming agent is, nevertheless, present in sufficient quantities to prevent excessive swelling of the foam batter on baking with consequent collapse of the cake on subsequent cooling. It has been found that the use of a farinaceous ingredient having a hexane extractable fat content within the range of 0.5–1.5% of the weight of the dried egg white in the mix provides the aforementioned advantages. This remarkable discovery represents a technique which has been sought by industry in the past but as far as I am aware has been impossible of achievement heretofore.

Objects of the present invention include the provisions, in a single package dry culinary mix suitable for preparation of foam batter type cakes, of reduced whipping or preparation time, increased foam height and stability, increased tolerance to the duration and character of whipping, and decreased sensitivity to the varying quality of cake ingredients and conditions which affect cake volume or height and cake quality after baking, particularly when employing, in the interest of increased economy, low levels of egg white (egg albumin) as the principal whipping agent. Other objects will be apparent from the discussion that follows.

It has been discovered that substantial improvement in the preparation of a single package foam batter cake overcoming the aforementioned difficulties and meeting the aforementioned objects can be provided by employing as an addition to the albuminous whipping agent (egg white) a small amount of partially degraded soy protein in combination with an alkali metal hexametaphosphate.

According to this invention, results far superior to those obtained by the use of either partially degraded soy protein or an alkali metal hexametaphosphate alone are obtained when the two are used as an auxiliary whipping agent combination, as in such combination the two apparently have a synergistic effect upon each other so that the time of preparation is decreased while the foam and cake height are increased with a concurrent increase in tolerance of the mix to the level of anti-foaming agent present in the mix.

It has also been discovered that when partially degraded soy protein in combination with an alkali metal hexametaphosphate is added as an auxiliary whipping agent, the film forming ability of the egg white is weakened so as to avoid collapse of the cakes upon cooling after baking. This permits the creation of a foam batter which will not overexpand during baking and is sufficiently stable so that desirable cakes can be produced which will not fail upon subsequent cooling. At the same time the combination of partially degraded soy protein and an alkali metal hexametaphosphate permits the foam batter to be whipped faster than heretofore possible and obtain a foam batter of increased height.

The soy protein employed as one of the auxiliary whipping agents in the present invention is partially degraded or hydrolyzed by any well-known technique such as by enzyme, alkali or acid treatment to yield a water soluble hydrolysate of soy protein. Such techniques are well known in the art and may be made in any well-known manner, for example, as taught in U.S. Patents Nos. 2,489,173; 2,489,208; 2,502,029; 2,502,482; 2,588,419.

The alkali metal hexametaphosphates that may be employed as one of the auxiliary whipping agents in the present invention include those of sodium, potassium, lithium, rubidium, cesium and ammonium. The ammonium radical is for many purposes classified with the alkali metals and is also so classified for the present purpose. The hexametaphosphates of lithium, rubidium and cesium, while operative in the present invention, are not commercially available for the most part. The hexametaphosphates are of somewhat uncertain composition and various formulas have been proposed for them; sodium hexametaphosphate, for example, has been indicated to be $Na_6P_6O_{18}$, $Na_6(PO_3)_6$ and a mixture of $Na_5[Na(PO_3)_6]$, $Na_4[Na_2(PO_3)_6]$ and $Na_6(PO_3)_6$. It has also been suggested that the hexametaphosphate occurs in the bis and tris forms. Some hexametaphosphates on the market are prepared in such a manner that other materials are provided in admixture with the hexametaphosphate. For example, one of the commercially available sodium hexametaphosphates is prepared with an excess of sodium carbonate so that solutions of the final product have a higher pH than is obtained with pure sodium hexametaphosphate. Such variations are for the most part usable and are intended to be included within the scope of the present invention.

The alkali metal hexametaphosphates are prepared for the most part by heating orthophosphates, metaphosphates, or pyrophosphates to a temperature of about 700° C. Suitable phosphates for this purpose are sodium diammonium phosphate, sodium hydrogen ammonium phosphate, sodium dihydrogen phosphate, disodium dihydrogen pyrophosphate and trisodium trimetaphosphate. Mixtures of phosphoric acid and sodium carbonate or sodium hydroxide may also be employed. In carrying out the fusion the object is to heat the material well above 600° C., this temperature being the transition temperature at which the trimetaphosphate is converted to the hexametaphosphate, and thereafter rapidly cooling the hexametaphosphate below 500° C. Between 500°–600° C. the hexametaphosphate gradually changes back to the trimetaphosphate.

Fat reduction in the mix can be effected by solvent extraction of a fraction of the cake flour or by dilution of the flour with relatively fat-free starch. While the fat content of flour has, for all practical purposes, been found the element to be controlled in order to provide such an improved single package cake mix, various other related materials, such as fatty acids, soaps, fatty acid amides, lipides, lipo-proteins, mineral oils, fatty alcohols, fatty esters, waxes, phospho-lipides, and the like, will conceivably function in an equivalent manner. Such materials would be additives to the farinaceous material and do not occur in ordinary foam-batter cake ingredients. When added to the farinaceous ingredients in an amount insufficient to prevent whipping but sufficient to prevent excessive swelling of the foam batter on baking and subsequent collapse of the cake on cooling such related materials would conceivably replace an equivalent amount of flour fat.

In the case of a single package mix such as described in the aforementioned co-pending application, the auxiliary whipping agent combination, of course, is incorporated as part of the overall ingredients of the mix. An operable range for a single package type of foam-batter cake mix is one wherein the partially degraded soy protein constitutes between 0.5 and 2.6% of the mix and is between 5 and 27.0% of the egg white and the alkali metal hexametaphosphate, typically sodium hexametaphosphate, constitutes between 0.08 and 1.0% of the mix and is between 0.88 and 13.3% of the egg white. A more preferred level of the soy protein is in the neighborhood of 0.75 to 1.5% of the ingredients of the mix and 7–15% of the egg white. A more preferred level of the sodium hexametaphosphate is in the neighborhood of 0.1 to 0.5% of the ingredients in the mix and 2.0 to 7.0% of the egg white. The most preferred range of whipping agents found to date is one wherein the soy protein is 1.9% by weight of the mix and is 19.2% by weight of the egg white and wherein the sodium hexametaphosphate is 0.3% by weight of the mix and is 3.3% of the weight of the egg white. Generally, the level of auxiliary whipping agent combination necessary will vary in accordance with the amount of anti-foaming agent present either as flour-fat or as represented by the starch to flour ratio. Thus, the package should include a high percentage of starch or hexane extracted flour, for example, in the farinaceous ingredients. Reduction of the amount of the anti-foaming agent generally lowers the level of degraded soy protein and alkali metal hexametaphosphate required for optimal results. On the other hand, increased amounts of degraded soy protein and sodium hexametaphosphate reduce the period required for whipping the batter and also enable a hand whip, as distinguished from a machine whip operation, to be more readily practiced in preparing the required foam batter.

A single package cake mix provided according to the present invention is distinguishable from the two package cake mix in that the level of degraded soy protein and alkali metal hexametaphosphate used is substantially greater, the degraded soy protein level being of the order of 0.5–2.6% of the weight of the entire mix and 5–27.0% of the egg white contained in the mix and the alkali metal hexametaphosphate, typically sodium hexametaphosphate, being of the order of 0.08 to 1.0% of the weight of the entire mix and 0.88 to 13.3% of the egg white contained in the mix. The increased level of partially degraded soy protein and alkali metal hexametaphosphate is apparently necessary to sufficiently increase the whipping capacity of the egg white in the presence of the farinaceous ingredients such that not only mechanical mixers can be employed but also the previously less efficient hand mix operation can be rendered practical. As indicated in the aforementioned co-pending application, the foam-batter type cake can be provided merely by sufficiently controlling the level of flour-fat in the fat extracted flour or the starch to flour ratio, but even under the most desirable conditions the development of a proper foam having the required volume or height is very tedious when hand mixing is used. In the presence of the auxiliary whipping agent combination of the present invention, however, a suitable foam is developed quickly and easily even by hand whipping.

Another consideration in single package foam-batter cake mix preparations is maintenance of the level of the sugar substantially below that practiced in the case of a multi-package cake mix. High levels of sugar substantially increase the viscosity of the batter with a corresponding reduction in the ease of beating. By maintaining the level of sugar in the neighborhood of 50% by weight of the package and within the range of 40–65%, the viscosity of the batter can be substantially reduced and the increased whippability of the dried egg white provided by the partially degraded soy protein can be more readily availed of in hand as well as mechanical mixing operations. Examples of such single package cake mix preparations are as follows:

*Example 1*

| | G. |
|---|---|
| Dried egg white | 41 |
| Partially degraded soy protein | 5 |
| Sodium hexametaphosphate | 3 |
| Sodium chloride | 1 |
| Dextrose | 10 |
| Dextrine | 6 |
| Cake flour | 4 |
| Starch | 130 |
| Sucrose | 200 |
| Calcium stearate | 5 |
| Citric acid | .7 |

The above dry mix is reconstituted by a single addition of liquid thereto, viz., 420 ml. The mix is simply beaten by hand with an egg beater for 6 minutes or with a standard No. 10 model Sunbeam Mixmaster at a speed setting of 10 for a period of 4 minutes. The foam batter is then poured into an ungreased 10″ tube pan and baked as in Example 1 to provide a cake 120 mm. high.

*Example 2*

Another example of such a single package cake mix of the foam-batter type is a mix containing:

| | G. |
|---|---|
| Dried egg white | 41 |
| Sodium hexametaphosphate | 2 |
| Dextrose | 10 |
| Coating sugar (sucrose) | 200 |
| Cream of tartar | 2 |
| Sodium chloride | 1 |
| Wheat starch | 125 |
| Flour | 6 |
| Calcium stearate | .05 |
| Partially degraded soy protein | 4 |

This mix is placed in a bowl of a mechanical mixer as before and with the mixer started 420 ml. of water are added thereto over a period of 1 minute. After mixing for an additional 5 minute period to fully develop the batter, it is then transferred to a 10″ tubular cake tin and baked at 375° F. for about 30 minutes. The resulting cake is 120 mm. high, of excellent texture and quality.

Thus, it will be seen that the employment of partially degraded soy protein and an alkali metal hexametaphosphate as an auxiliary whipping agent combination has marked advantages in single-package foam-batter cake mix preparations. In all of such cake preparations the mixing period is substantially reduced and tolerances to mixing have been increased such that as a practical matter over- and under-whipping has been eliminated. By sufficiently controlling the level of partially degraded soy protein and alkali metal hexametaphosphate, the accompanying increase in whipping tolerance does not sacrifice the fine grain and texture of such foam-batter cakes. The foregoing whipping tolerances are achieved concurrently with a reduction in sensitivity to varying qualities of egg white as the principal whipping agent. By reason of the marked increase in the aerating properties of the egg white generally, a superior foam height and foam stability results having increased tolerance to the presence of high levels of sugar as well as farinaceous ingredients. As a result a cake product of improved volume or height results with an increased ease and simplicity of batter preparation.

While the present invention has been described with particular reference to specific examples, it is not to be limited thereby, but reference is to be had to the appended claims for a definition of its scope.

What is claimed is:

1. In the art of preparing cakes of the foam-batter type employing egg white as a principal whipping agent, sugar and a farinaceous ingredient, the improvement which comprises employing said ingredients in combination in the preparation of a foam batter and incorporating into the ingredients to be employed in the preparation of said foam batter an auxiliary whipping agent combination comprising partially degraded soy protein and an alkali metal hexametaphosphate, the ingredients having present an egg white anti-foaming agent in an amount insufficient to prevent whipping of said egg white in the presence of said farinaceous ingredient but sufficient to prevent excessive swelling of the batter on baking and subsequent collapse of the cake on cooling.

2. In the art of preparing cakes of the foam-batter type employing egg white as a principal whipping agent, sugar and a farinaceous ingredient, the improvement which comprises employing said ingredients in combination in the preparation of a foam batter and incorporating into the ingredients to be employed in the preparation of said foam batter an auxiliary whipping agent combination comprising partially degraded soy protein and sodium hexametaphosphate, the ingredients having present an egg white anti-foaming agent in an amount insufficient to prevent whipping of said egg white in the presence of said farinaceous ingredient but sufficient to prevent excessive swelling of the batter on baking and subsequent collapse of the cake on cooling.

3. In the art of preparing cakes of the foam-batter type employing egg white as a principal whipping agent, sugar and a farinaceous ingredient, the improvement which comprises employing said ingredients in combination in the preparation of a foam batter and incorporating into said ingredients to be employed in the preparation of said foam batter an auxiliary whipping agent combination comprising partially degraded soy protein and an alkali metal hexametaphosphate, the ingredients having present an egg white anti-foaming agent in an amount insufficient to prevent whipping of the egg white in the presence of the farinaceous ingredient but sufficient to prevent excessive swelling of the batter on baking and subsequent collapse of the cake on cooling, said partially degraded soy protein and alkali metal hexametaphosphate being employed in an amount sufficient to effect improved whipping tolerances for the egg white in the presence of said farinaceous ingredient, wherein said partially degraded soy protein is present at a level of 0.5 to 2.6% of the mix and at a level of 5.0 to 27.0% of the egg white in said mix and said alkali metal hexametaphosphate is present at a level of 0.08 to 1.0% of the mix and at a level of 0.88 to 13.3% of the egg white in said mix.

4. In the art of preparing cakes of the foam-batter type employing egg white as a principal whipping agent, sugar and a farinaceous ingredient, the improvement which comprises employing said ingredients in combination in the preparation of a foam batter and incorporating into said ingredients to be employed in the preparation of said foam batter an auxiliary whipping agent combination comprising partially degraded soy protein and an alkali metal hexametaphosphate, the ingredients having present an egg white anti-foaming agent in an amount insufficient to prevent whipping of the egg white in the presence of the farinaceous ingredient but sufficient to prevent excessive swelling of the batter on baking and subsequent collapse of the cake on cooling, said partially degraded soy protein and alkali metal hexametaphosphate being employed in an amount sufficient to effect improved whipping tolerances for the egg white in the presence of said farinaceous ingredient, wherein said partially degraded soy protein is present at a level of 0.75 to 2.0% of the mix and at a level of 7.0 to 20.0% of the egg white in said mix and said alkali metal hexametaphosphate is present at a level of 0.1 to 0.5% of the mix and at a level of 2.0 to 7.0% of the egg white in said mix.

5. In the art of preparing cakes of the foam-batter type employing egg white as a principal whipping agent, sugar and a farinaceous ingredient, the improvement which comprises employing said ingredients in combination in the preparation of a foam batter and incorporating into said ingredients to be employed in the preparation of said foam batter an auxiliary whipping agent combination comprising partially degraded soy protein and an alkali metal hexametaphosphate, the ingredients having present an egg white anti-foaming agent in an amount insufficient to prevent whipping of the egg white in the presence of the farinaceous ingredient but sufficient to prevent excessive swelling of the batter on baking and subsequent collapse of the cake on cooling, said partially degraded soy protein and alkali metal hexametaphosphate being employed in an amount sufficient to effect improved whipping tolerances for the egg white in the presence of said farinaceous ingredient, wherein said partially degraded soy protein is present at a level of 1.9% of the mix and at a level of 19.2% of the egg white in said mix and said alkali metal hexametaphosphate is present at a level of 0.3% of the mix and at a level of 3.3% of the egg white in said mix.

6. In the art of preparing cakes of the foam-batter type employing egg white as a principal whipping agent, sugar and a farinaceous ingredient, the improvement which comprises employing said ingredients in combination in the preparation of a foam batter and incorporating into said ingredients to be employed in the preparation of said foam batter an auxiliary whipping agent combination comprising partially degraded soy protein and an alkali metal hexametaphosphate, the farinaceous ingredient having a hexane extractable fat content in an amount insufficient to prevent whipping of the egg white in the presence of the farinaceous ingredient but sufficient to prevent excessive swelling of the batter on baking and subsequent collapse of the cake on cooling, the hexane extractable fat content being within the range of 0.5–1.5% of the weight of the dried egg white in the mix, said partially degraded soy protein and alkali metal hexametaphosphate being employed in an amount sufficient to effect improved whipping tolerances for the egg white in the presence of said farinaceous ingredient.

7. In the art of preparing cakes of the foam-batter type employing egg white as a principal whipping agent, sugar and a farinaceous ingredient, the improvement which comprises employing said ingredients in combination in the preparation of a foam batter and incorporating into said ingredients to be employed in the preparation of said foam batter an auxiliary whipping agent combination comprising partially degraded soy protein and an alkali metal hexametaphosphate, the farinaceous ingredient having a hexane extractable fat content in an amount insufficient to prevent whipping of the egg white in the presence of the farinaceous ingredient but sufficient to prevent excessive swelling of the batter on baking and subsequent collapse of the cake on cooling, the hexane extractable fat content being within the range of 0.5–1.5% of the weight of the dried egg white in the mix, said partially degraded soy protein and alkali metal hexametaphosphate being employed in an amount sufficient to effect improved whipping tolerances for the egg white in the presence of said farinaceous ingredient, said partially degraded soy protein being present at a level of 0.50 to 2.60% of the mix and at a level of 5.00 to 27.00% of the egg white in said mix and said alkali metal hexametaphosphate being present at a level of 0.08 to 1.00% of the mix and at a level of 0.88 to 13.30% of the egg white in said mix.

8. In the art of preparing cakes of the foam-batter type employing egg white as a principal whipping agent, sugar and a farinaceous ingredient, the improvement which comprises employing said ingredients in combination in the preparation of a foam batter and incorporating into said ingredients to be employed in the preparation of said foam batter an auxiliary whipping agent combination comprising partially degraded soy protein and sodium hexametaphosphate, the farinaceous ingredient having a hexane extractable fat content in an amount insufficient to prevent whipping of the egg white in the presence of the farinaceous ingredient but sufficient to prevent excessive swelling of the batter on baking and subsequent collapse of the cake on cooling, the hexane extractable fat content being within the range of 0.5–1.5% of the weight of the dried egg white in the mix, said partially degraded soy protein and sodium hexametaphosphate being employed in an amount sufficient to effect improved whipping tolerances for the egg white in the presence of said farinaceous ingredient, said partially degraded soy protein being present at a level of 0.50 to 2.60% of the mix and at a level of 5.00 to 27.00% of the egg white in said mix and said sodium hexametaphosphate being present at a level of 0.08 to 1.00% of the mix and at a level of 0.88 to 13.30% of the egg white in said mix.

References Cited in the file of this patent

UNITED STATES PATENTS

| | | |
|---|---|---|
| 2,176,079 | Katzman | Oct. 17, 1939 |
| 2,588,419 | Sevell et al. | Mar. 11, 1952 |
| 2,671,730 | Finucane et al. | Mar. 9, 1954 |

OTHER REFERENCES

Modern Cereal Chemistry (fourth edition), by Kent-Jones and Amos, The Northern Publishing Co., Ltd., Liverpool, 1947, pp. 296 and 297.